United States Patent [19]

Binder Kriegelstein et al.

[11] 4,186,480
[45] Feb. 5, 1980

[54] METHOD OF MANUFACTURING A ROTATABLE MAGNETIC HEAD ARRANGEMENT

[75] Inventors: Wolfgang Binder Kriegelstein; Erich Berger, both of Vienna, Austria

[73] Assignee: U.S. Philips Corporation, New York, N.Y.

[21] Appl. No.: 860,282

[22] Filed: Dec. 14, 1977

[30] Foreign Application Priority Data

Dec. 22, 1976 [AT] Austria ................................. 9536/76

[51] Int. Cl.² .............................................. G11B 5/42
[52] U.S. Cl. .............................. 29/603; 219/121 LM; 219/124.1; 360/84; 360/122
[58] Field of Search .................. 29/603; 219/121 LM, 219/121 L, 124; 360/84, 122

[56] References Cited

U.S. PATENT DOCUMENTS

| | | | |
|---|---|---|---|
| 3,621,153 | 11/1977 | Wenner | 29/603 X |
| 4,017,965 | 4/1977 | Brutsch et al. | 29/603 |
| 4,120,008 | 10/1978 | Metzger | 360/84 X |

Primary Examiner—Carl E. Hall
Attorney, Agent, or Firm—Thomas A. Briody; David R. Treacy; Robert S. Smith

[57] ABSTRACT

A method of manufacturing a rotatable magnetic head arrangement in which at least one magnetic head provided on a disc-shaped carrier in a given position with respect to a reference surface provided on the carrier is laser machined to form a gap width of a particular size and location relative to said reference surface.

4 Claims, 9 Drawing Figures

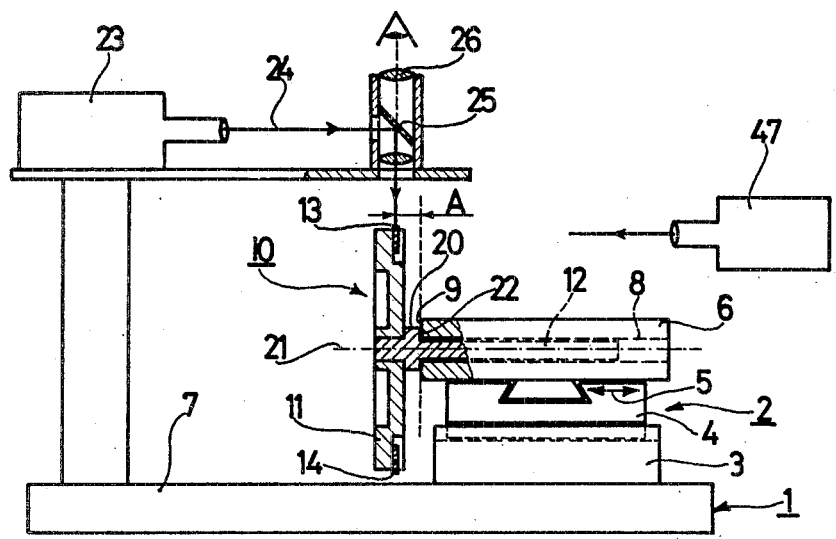
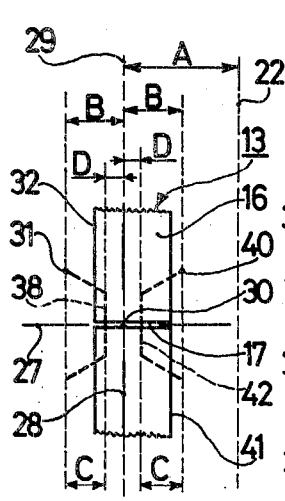
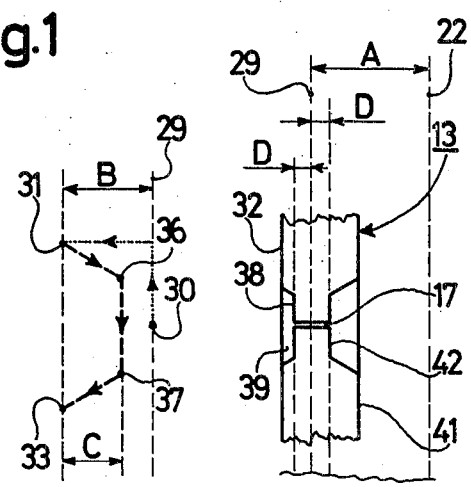
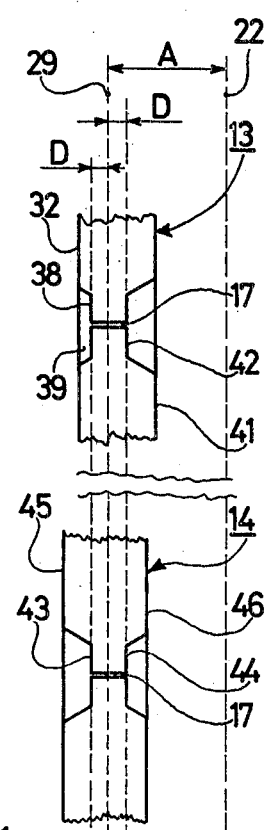
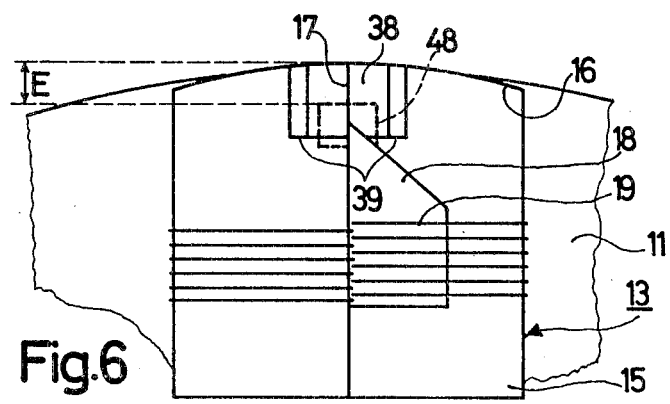
Fig.1  Fig.2  Fig.3  Fig.4  Fig.5  Fig.6

METHOD OF MANUFACTURING A ROTATABLE MAGNETIC HEAD ARRANGEMENT

The invention relates to a method of manufacturing a rotatable magnetic head arrangement for recording and/or playback apparatus for signals having a wide frequency spectrum, in particular video signals, in which at least one magnetic head comprising a plate-shaped magnetic circuit having a tape contact face, an operative gap and a coil window and a coil passing through the coil window, is provided on a disc-shaped carrier in a given position with respect to a reference surface provided on the carrier and extending at right angles to its axis of rotation. Such a method is described, for example, in Austrian Patent Specification No. 293,499. For the reliable operation of such magnetic head arrangements it is of particular importance that the magnetic heads exactly assume the given position on the carrier of the magnetic head arrangement. This is the more important according as the tracks which are scanned by the magnetic head(s) on the record carrier are narrower and according as adjacent tracks are situate more closely together on the record carrier.

It is the object of the invention to provide methods of manufacturing a rotatable magnetic head arrangement of the kind mentioned in the preamble with which a particularly exact positioning of the magnetic heads on the carrier is achieved in a particularly simple and reliable manner. For that purpose, a method according to the invention is characterized in that a reference level for the operative gap of the magnetic head is fixed at a given distance which, viewed in the width of the gap, falls substantially in the central area of the operative gap of the magnetic head, after which with reference to said level so much material is removed by means of a laser beam directed on the tape contact face of the magnetic head at the area of the operative gap first from a major surface of the plate-shaped magnetic circuit bounding the operative gap in the direction of the gap width and then from the other oppositely located major surface over the whole gap height, that the gap width of the operative gap is reduced to a given size by the formation of two oppositely located groove-shaped recesses. Since the ultimate width of the operative gap is formed only after providing the magnetic head on the carrier in relation to a given reference level, it is achieved in this manner that the operative gap of the magnetic head has an accurately determined gap width and position with respect to the reference surface on the carrier, respectively, in the case of several magnetic heads provided on the carrier, the effective gaps of all magnetic heads have exactly the same gap width and position with respect to the reference surface. It has been surprisingly found that the attenuation in the signal level produced by the magnetic head as a result of the reduction of the gap width of the operative gap is not so large as was expected, which is due to the fact that the material removal by means of a laser beam does not adversely influence the material structure of the magnetic circuit as is the case in other machining methods, for example grinding.

In a method in which at least two magnetic heads are provided on the carrier at a given angular distance viewed in the circumferential direction of the carrier, it has proved particularly advantageous according to the invention when magnetic heads succeeding each other viewed in the circumferential direction of the carrier are provided on the carrier with mutually opposite azimuthal angles of the operative gaps in their given positions, after which with an optical device in the reference level the circumferential distance of the two operative gaps from each other is measured and, in the case of differences of these circumferential distances from a given nominal value, a new reference level is fixed by changing the reference level in which the measured circumferential distance corresponds to the nominal value, after which the gap width of the operative gaps is reduced to the given size with respect to said level by means of the laser beam. In this manner it is achieved that the magnetic heads not only comprise operative gaps having the same gap widths which are positioned at the same distance to the reference surface, but also that the position of the operative gaps in the circumferential direction of the carrier is exactly fixed. It is to be noted that magnetic head arrangements are known of course having magnetic heads whose operative gaps show mutually opposite azimuthal angles. In order to ensure an exact position of the operative gaps in such known magnetic head arrangements, usually comparatively complicated adjusting devices for magnetic heads are required which are not necessary when using the above-described method according to the invention.

In view of a simple and efficacious method of forming the ultimate gap width of the operative gap it has proved advantageous when the material removal produced by means of the laser beam occurs in the form of grooves having a trapezoidal cross-section which are narrowed towards the reference level. A further advantageous embodiment of the method according to the invention is characterized in that after reducing the gap width of the operative gap to the given size by material removal in the area of the operative gap remote from the tape contact face of the magnetic head by means of a laser beam directed on the major surface of the plate-shaped magnetic circuit a recess widening the coil window is formed which reduces the gap height of the operative gap to given size. As a result of this, the magnetic heads show not only an accurately defined gap width but also an accurately defined gap height, in which is has proved advantageous again to perform the material removal by means of a laser beam since this does not adversely influence the material structure of the magnetic circuit.

The invention furthermore relates to a magnetic head arrangement manufactured according to a method of the invention. Such a magnetic head arrangement is characterized in that at least one magnetic head provided on a disc-shaped carrier of the magnetic head arrangement comprises, on its magnetic circuit in the form of a plate, two oppositely located groove-shaped recesses which are produced by a laser beam, bound the gap width of the operative gap, and fix the operative gap at a given distance to a reference surface provided on the carrier. In this manner the position of the operative gap of a magnetic head of such a magnetic head arrangement is exactly fixed without this requiring separate adjusting means for the magnetic head.

The invention will now be described in greater detail with reference to the drawing which shows a few embodiments of the invention to which, however, it is not to be restricted.

FIG. 1 shows diagrammatically a device for carrying out a method according to the invention.

FIG. 2 is a plan view of the area of the operative gap of a magnetic head on its tape contact face.

FIG. 3 shows a first possibility for the relative movement between magnetic head and laser beam for the material removal.

FIG. 4 shows a second possibility for the relative movement between magnetic head and laser beam for the material removal.

FIG. 5 is a diagrammatic developed view of the areas of the operative gaps of two magnetic heads provided on a carrier of the magnetic head arrangement as a plan view on its tape contact face.

FIG. 6 is a plan view of a magnetic head provided on a carrier of the magnetic head arrangement on its magnetic circuit.

Figure 7:
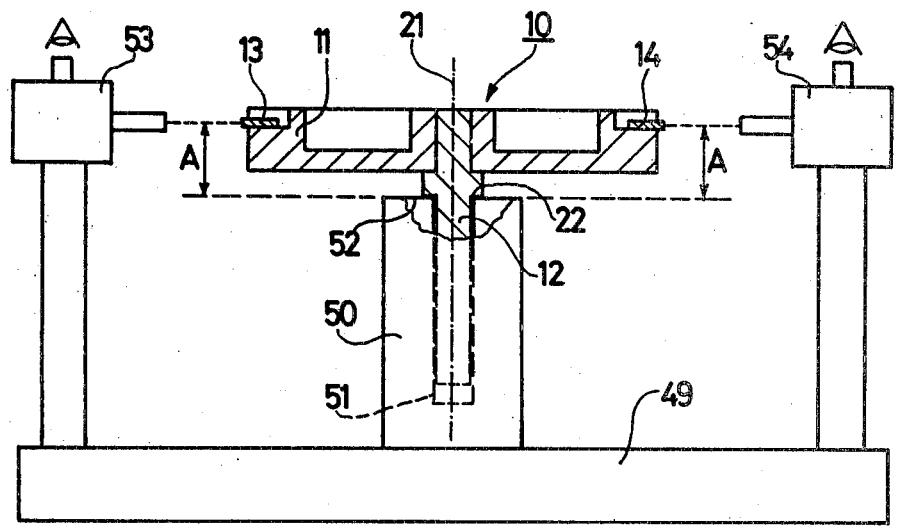
FIG. 7 shows a further device for carrying out a method according to the invention with which the circumferential position of the operative gaps of two magnetic heads is determined.

Reference numeral 1 in FIG. 1 denotes a support plate on which an XY-coordinate table 2 is provided. Said XY coordinate table consists of a basic body 3 on which a first table part 4 is arranged so as to be movable in the direction of the double arrow 5. A second table part 6 is provided on the table part 4 so as to be movable in a direction at right angles to the double arrow 5. In this manner, the table part 6 can be moved in any position in a plane parallel to the major surface 7 of the support plate in that the two table parts 4 and 6 are moved in accordance with the X and Y coordinates of the desired position. A motor and a position indicator are advantageously associated with each of the two table parts 4 and 6 and are connected to a control device so that the two table parts can be moved automatically. The corresponding orders may be given to the control device either manually or via a programme control device. Table part 6 comprises a bore 8 debouching into a side surface 9 of the table part 6 provided as a reference plane of the XY coordinate table.

A magnetic head arrangement destined for a recording and/or playback apparatus in which it is rotatably drivable, comprises a disc-shaped carrier 11 which forms one unit with a shaft 12. Provided on the carrier 11 are two diametrically oppositely located magnetic heads 13 and 14 which, as is shown in FIG. 6, comprise a plate-shaped magnetic circuit 15 having a tape contact face 16, an operative gap 17 and a coil window 18 and a coil 19 passing through the coil window 18. The shaft 12 has an annular shoulder 20 whose end face 22 extending at right angles to the axis of rotation 21 of the magnetic head arrangement forms a reference surface. The magnetic heads 13 and 14 are provided on the carrier 11 in a given position with respect to the above reference surface 22, as described for example, in Austrian Patent Specification No. 293,499, so that the magnetic heads in the axial direction of the magnetic head arrangement have a given distance to the reference surface 22 and assume the desired positions both in the radial direction and in the circumferential direction. These positions of the magnetic heads 13 and 14 on the carrier 11 are already comparatively accurate with a view to the nominal position, but in practice not yet accurate enough in such cases in which the magnetic heads are to scan very narrow tracks which are situated very closely together on the record carrier.

The magnetic head arrangement 10 is now inserted with its shaft 12 in the bore 8 provided in the XY coordinate table 2 on the table part 6, the reference surface 22 on the shoulder 20 of the shaft 12 engaging the reference surface 9 of the table part 6. Thus the magnetic head arrangement 10 can be provided in any position by means of the XY coordinate table 2.

A device 23 to produce a laser beam 24 is furthermore provided on the support plate 1. Said laser beam 24 leaving the device 23 in a direction parallel to the major surface 7 of the support plate 1 is deflected by means of an optical deflection device 25 in a direction extending at right angles to the major surface 7 of the support plate 1. The optical deflection device 25 forms part of a microscope 26 shows diagrammatically which has a crosshair, in the point of intersection of which the laser beam passes so that a viewed can determine the point of impact of the laser beam on an object which is in the path of rays, and can determine the position of the object with respect to the laser beam, respectively.

The carrier 11 having the magnetic heads 13 and 14 is now moved in a given starting position with respect to the laser beam by means of the XY coordinate table 2, so that a reference levelis fixed for the operative gaps of the magnetic heads. Said reference level is at a distance A from the reference surface 9 at the XY coordinate table and hence also from the reference surface 22 on the carrier 11. It is determined by a plane in which the laser beam lies and which extends parallel to the reference surface 9. The distance A is chosen to be so that the reference level falls essentially in the central area of the operative gap viewed in the gap width. The carrier 11 on the table part 6 is then turned until the operative gap of one of the two magnetic heads coincides with the reticule of the microscope 26. FIG. 2 shows diagrammatically such a situation for the magnetic head 13. 27 and 28 denote the crosshairs of the reticule and the line 29 gives the reference level extending at a distance A to the reference surface 22. In this manner a starting position is fixed for the laser beam which in FIG. 2 is denoted by the dot 30.

By means of the programme control for the XY coordinate table a displacement movement therefor is now fixed which determines the machining operation of the magnetic head in the area of its operative gap by means of the laser beam. As shown diagrammatically in FIG. 3, the XY coordinate table is first moved so that the magnetic head assumes a position 31 with respect to the laser beam from which the machining operation starts. This position 31 lies laterally of the operative gap 17 and at a given distance B from the reference level 29 and that in such manner that, while considering all possible tolerances, it lies at least slightly outside the major surface 32 of the magnetic circuit 15 bounding the operative gap in the direction of the width.

A meander-like displacement movement for the XY coordinate table is then introduced by means of the programme control for said table which produces a relative movement of the laser beam with respect to the magnetic head 13 in the direction of the reference level 29. Starting from the position 31 the positions 33, 34, 35 and so on up to 36 and finally 37 are traversed successively. The meander-like movement occurs over a distance C which lies at a given distance D from the reference level 29. During said meander-like movement the laser device 23 is switched on so that material of the magnetic circuit is removed by means of the laser beam directed on the tape contact face 16 of the magnetic head 13 as soon as said beam has reached the major surface 32 of the magnetic circuit and that so long until in position 37 the machining operation is discontinued. In this manner, a groove-shaped recess 38 is formed at the area of the effective gap 17 starting from the major surface 32 of the magnetic circuit, which recess reduces the gap width of the operative gap 17 with respect to the reference level 29 to the given size D; see also FIG. 5. The energy of the laser beam and the relative movement of the magnetic head with respect to the laser beam are matched to each other so that so much material of the magnetic circuit is removed and the groove-shaped recess extends over the whole gap height, so that the recess 38 at its end remote from the tape contact face 16 is partly bounded by a wall 39 of the magnetic circuit, as is shown in FIGS. 5 and 6. The coil 19 is not shown in FIG. 5 to avoid complexity of the drawing.

As shown in FIG. 3 the meander-like relative movement between the magnetic head and the laser beam is controlled so that the sections extending parallel to the major surface 32 of the magnetic circuit become shorter and shorter according as they are situated closer to the reference level 29. In this manner a groove-shaped recess is obtained having a trapezoidal cross-section narrowing towards the reference level 29. Such a cross profile has proved to be particularly advantageous in practice. Of course it would also be possible to form the groove-like recess with a different cross profile, for example, a rectangular profile or a profile in the form of a segment of a circle.

FIG. 4 shows another possibility for the control of the relative movement between the magnetic head and the laser beam, in which the laser beam directly traverses the positions 31, 36, 37 to 33 as a result of which a cut is formed which separates the material to be removed from the magnetic circuit which, as a result of the amount of material which is only small when the position 33 is reached flies off the magnetic circuit. Such a control results in a particularly short machining time.

After the above-described machining process to form the groove-shaped recess 38, a further position 40 for the laser beam shown in FIG. 2 is adjusted by means of the control device for the XY coordinate table, which position, analogous to the position 31, lies again laterally of the operative gap 17 at a given distance B with respect to the reference level 29 but is now situated laterally of the major surface 41 of the magnetic circuit opposite to the major surface 32. By means of the control device for the XY coordinate table, again a meander-like relative movement between the magnetic head and the laser beam is produced and the laser device 23 is made operative. The meander-like movement again occurs over a distance C in the direction of the reference level 29, as a result of which the laser beam, starting from the major surface 41 of the magnetic circuit, forms a groove-shaped recess 42 while removing material, which recess, when the distance C is reached, reduces the gap width of the operative gap with respect to the reference level 29 to the tiven size D.

In this manner, the two recesses 38 and 42 limit the operative gap to a width of exactly 2D, the centre of the operative gap fixed by the reference level 29 lying at the given distance A from the reference surface 22 on the support 11. Thus, the operative gap for the magnetic head 13 is exactly fixed both as regards its width and its position with respect to the reference surface on the support.

The XY coordinate table is then again moved to its initial position and the support 11 is rotated until the operative gap 17 of the magnetic head 14 coincides with the cross hairs 27, 28 of the microscope 26. Thus, the laser beam is moved to an initial position 30 with respect to the operative gap 17 of the magnetic head 14 which lies again in the same reference level 29 as the one above at the magnetic head 13. By means of the programme control for the XY coordinate table, in an analogous manner starting first from a position 31 and then from a position 40 groove-like recesses 43 and 44 are formed at the area of the operative gap, which recesses are situated opposite to each other and now start from the major surface 45 and then from the major surface 46 of the magnetic circuit of the magnetic head 14, as shown in FIG. 5. Thus, the operative gap of the magnetic head 14 is also limited to a width of exactly 2D, the reference level 29 again fixing the centre of the operative gap.

Thus it is achieved that the operative gaps of the two magnetic heads 13 and 14 have exactly the same gap width 2D and their centres are situated on one and the same reference level 29, with which the two operative gaps also have the same distance to the reference surface 22 on the carrier 11 and the boundaries of the gap width formed by the groove-shaped recesses, viewed in the circumferential direction of the support, are in alignment as shown in the developed view of FIG. 5. In this manner, tolerances which arise during the provision of the magnetic heads 13 and 14 on the carrier 11 with respect to the distance A of the reference surface 22 on the carrier 11 are fully compensated for by the formation of the operative gaps with reduced gap width on the magnetic heads already provided on the carrier. This may be recognized by the fact that the recess 42 in the magnetic head 13 is deeper than the recess 44 in the magnetic head 14 and the recess 38 in the magnetic head 13 is less deep than the recess 43 in the magnetic head 14, respectively, it being assumed that the magnetic head 13 after assembly on the carrier 11 has a slightly smaller distance to the reference surface 42 on the carrier 11 than the magnetic head 14. As a result of the method according to the invention, the gap widths of the operative gaps and their position with respect to the reference surface on the carrier are thus fixed exactly for both magnetic heads.

Following the machining of the gap width of the effective gaps, the gap height thereof is advantageously also brought at a given size. For this purpose, a recess widening the coil window 18 is formed by material removal by means of a laser device 47 shown diagrammatically and having a laser beam which is directed onto the major surface of the magnetic circuit, as is shown in FIG. 6 by the broken lines 48. As shown, said recess limits the gap height to the size E. In this manner, both magnetic heads 13 and 14 obtain the same gap height, which, together with the same gap width, produces very uniform signal levels produced by the magnetic heads. Of course it is also possible for these machining operations to use the same device as for providing the groove-shaped recesses to limit the gap width of the effective gaps when the XY coordinate table is adapted so that the carrier with the magnetic heads can be provided on said table in the position corresponding hereto, in which the major surfaces of the magnetic circuits of the magnetic heads must extend at right angles to the laser beam. The corresponding relative movement between magnetic head and laser beam may then be produced again by a programme control for the XY coordinate table starting from an initial position which is fixed, for example, by a templet.

A method according to the invention will now be described with reference to an example, in which two magnetic heads are provided on the carrier of the magnetic head arrangement at an angular distance from each other deviating, for example, slightly from 180° viewed in the circumferential direction of the carrier, the magnetic heads mutually having opposite azimuthal angles of the operative gap. What is important in such a magnetic head arrangement is not only that the operative gaps of the two magnetic heads have the same gap width and lie at the same reference level with respect to a reference surface, but also that the angular distance from one operative gap to the other is exactly maintained. This can also be achieved by means of a method according to the invention. Starting point is again a magnetic head arrangement as already described in which the operative gaps are provided in the given positions on the carrier 11 of the magnetic head arrangement 10 having a reference surface 22 and mutually opposite azimuthal angles of the magnetic heads 13 and 14, for example, according to a method described in Austrian Patent Specification No. 293,499, in which positions, however, may not have been maintained sufficiently accurately by tolerances always occurring.

For carrying out the method may be used inter alia a device as shown in FIG. 7 comprising a support plate 49 on which a cylindrical support 50 is provided having an axial bore 51 which debouches into an end face 52 serving as a reference surface and extending parallel to the support plate 49. The shaft 12 of the support 11 of the magnetic head arrangement 10 is inserted into said bore 51, the reference surface 22 of the support engaging the end face 52. In this manner, the two magnetic heads 13 and 14 already provided on the carrier 11 extend in a plane parallel to the end face 52.

The device shown in FIG. 7 furthermore comprises an optical device consisting of two microscopes 53 and 54 having reticules and provided on the support plate 49 and adjusted in such manner as to be aligned radially to the axis 21 of the carrier 11, the points of intersection of their cross hairs are situated at a given distance A to the end face 52 of the support 50 serving as a reference surface and its angular distance with respect to the axix 21 of the carrier 11 corresponds to that of the desired angular distance of the operative gaps of the two magnetic heads. The adjustment of the two microscopes is advantageously carried out with a corresponding templant. By the distance A again a reference level is fixed which is chosen to be so that, with the carrier inserted in the device, it falls substantially in the central area of the operative gaps of the magnetic heads viewed in the gap width.

Figure 8:
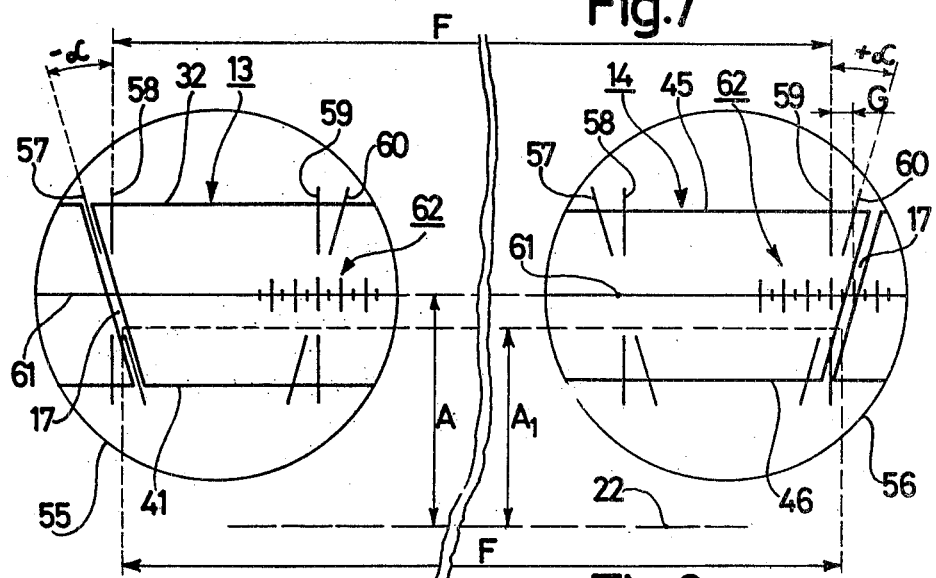
FIG. 8 shows the microscopic fields of two microscopes used in the device shown in FIG. 7.

FIG. 8 is a developed view on the one hand of the field of view 55 of the microscope 53 and on the other hand the field of view 56 of the microscope 54. Both microscopes have two reticules, namely one reticule consisting of the lines 57 and 58 and the other reticule consisting of the lines 59 and 60, a line 61 being drawn through the points of intersection of the two reticules which fixes the distance A to the reference surface and hence the reference level. The reticules are further constructed so that the lines 57 and 58 of one reticule enclose an angle $-\alpha$ and the lines 59 and 60 of the other reticule enclose an angle $+\alpha$, the amount of $\alpha$ corresponding to the azimuthal angle of the operative gaps of the magnetic head. The reticule formed by the lines 57 and 58 is associated with the microscope 53 and the reticule formed by the lines 59 and 60 is associated with the microscope 64. As a result of the above adjustment of the microscopes 53 and 54 with respect to the given angular distance one reticule 57, 58 corresponds to the desired accurate position of the operative gap of one magnetic head and the reticule 59 and 60 corresponds to the desired accurate position of the operative gap of the other magnetic head. The distance denoted in FIG. 8 by F between the points of intersection of the two reticules thus corresponds in the developed view to the circumferential distance, corresponding to the given angular distance, of the operative gaps of the two magnetic heads in the reference level. The provision of each time two reticules permits of a simple control and adjustment, respectively, of the optical device by a conversion method.

After inserting a carrier 11 with the magnetic heads 13 and 14 provided thereon into the device, it is turned until the magnetic head comprising one azimuthal angle $-\alpha$, for example the magnetic head 13, is moved in front of the microscope 53 and the operative gap 17 thereof is made to coincide with the line 57 of the reticule, as is shown in FIG. 8. The operative gap 17 of the magnetic head 14 appears in the field of view of the microscope 54 with the azimuthal angle $+\alpha$. When the two operative gaps of the magnetic heads 13 and 14 in the reference level A comprise the given nominal value for the angular distance, the operative gap 17 of the magnetic head 14 coincides with the line 60 of the reticule in question. In the embodiment described it has been assumed that the angular distance of the two operative gaps in the reference level A is too large. Accordingly, as shown in FIG. 8, the operative gap 17 of the magnetic head 14 is situated on the right of the line 60 of the relevant reticule, which means that the circumferential distance in the reference levelis too large by an amount G compared with the nominal value F. The amount of G can be read directly by means of a scale 62 provided in the range of the reticule 59, 60 provided on the line 61. By moving the reference level A it is now possible to fix such a reference level that the circumferential distance between the two operative gaps corresponds exactly to the given nominal value F. A direct measure of the required displacement of the reference level is the amount of G in connection with the amount of the azimuthal angle $\alpha$. As shown in FIG. 8, in the present embodiment a displacement of the reference level to the value $A_1$ is required in order that in this new reference level the circumferential distance between the two operative gaps corresponds to the value F.

Figure 9:
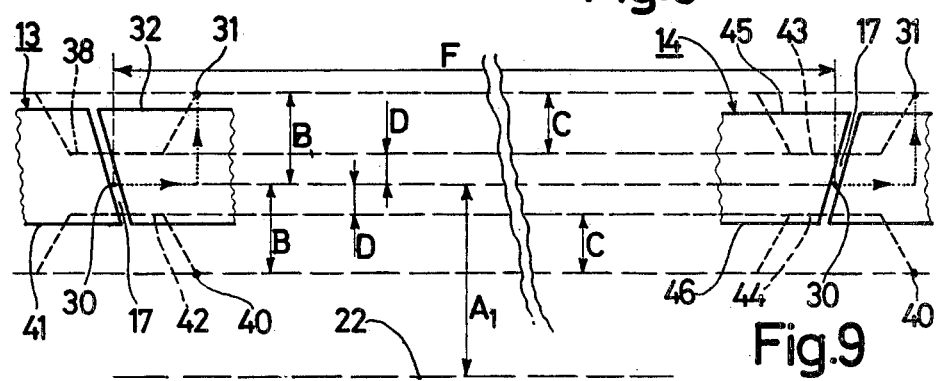
FIG. 9 shows diagrammatically a developed view of the areas of the operative gaps of two magnetic heads provided on the carrier of the magnetic head arrangement as a plan view on their tape contact face.

The magnetic head arrangement measured in this manner is now inserted in a device shown in FIG. 1 and the initial position for the XY coordinate table is adjusted so that the distance $A_1$ exists between reference surface 9 and the laser beam directed on the support plate 1. Herewith, the reference level for the magnetic head arrangement is fixed at $A_1$. The two magnetic heads 13 and 14 are then machines successively at the area of their operative gaps by means of the laser beam directed on the tape contact face in accordance with a given programme for the relative movement between magnetic head and laser beam, in such manner that groove-shaped recesses are again formed which bound the gap width of the two operative gaps to a given value of 2D, entirely analogous as explained in the preceding example, in which in this case, however, the reference level for the individual machining steps is $A_1$. The proportions in question are shown in the developed view of FIG. 9.

As a result of this it is achieved that at the reference level $A_1$ the circumferential distance of the operative gaps of the two magnetic heads 13 and 14 exactly corresponds to the nominal value F, with which, as desired, the operative gaps are situated at the given angular distance from each other. In addition, both operative gaps have the same gap width 2D and the boundaries of the operative gaps by the provided groove-shaped recesses 38 and 42 and 43 and 44, respectively, are in exact alignment in the circumferential direction of the carrier since the centres of the two operative gaps are fixed by the reference level $A_1$. A magnetic head arrangement manufactured in this manner thus fulfils most accurately the requirements imposed thereon.

When in another magnetic head arrangement a different value G for the circumferential distance of the operative gaps is measured, the method is carried out entirely analogously. For this magnetic head arrangement, the value for the reference level of the machining by means of the laser beam corresponding to the relevant value G is to be used as a base.

Of course, for carrying out the above-described method it is alternatively possible to combine the two devices shown in FIGS. 7 and 1 to form a single device. Of course it would also be possible to produce the relative movement between a magnetic head and the laser beam in such manner that the laser beam is deflected accordingly and the magnetic head is fixed during the machining.

We claim:

1. A method of manufacturing a rotatable magnetic head arrangement for recording and/or playback apparatus for signals having a wide frequency spectrum such as video signals, in which at least one magnetic head comprising a plate-shaped magnetic circuit having a tape contact face, an operative gap and a coil window and a coil passing through the coil window, is provided on a disc-shaped carrier in a given position with respect to a reference surface provided on the carrier and extending at right angles to its axis of rotation, which comprises: fixing a reference level for the operative gap of a magnetic head at a given distance from the reference surface on the carrier which falls essentially in the central area of the operative gap of the magnetic head viewed in the gap width, and then with reference to this level removing so much material by means of a laser beam directed on the tape contact face of the magnetic head at the area of the operative gap first from a major surface of the plate-shaped magnetic circuit bounding the operative gap in the direction of the gap width and then from the oppositely located major surface over the whole gap height, that the gap width of the operative gap is reduced to a given size by the formation of two oppositely located groove-shaped recesses.

2. A method as claimed in claim 1 in which at least two magnetic heads are provided on the carrier at a given angular distance viewed in the circumferential direction of the carrier, wherein the magnetic heads succeeding each other viewed in the circumferential direction of the carrier are provided in the given position on the carrier with mutually opposite azimuthal angles of the operative gaps, after which with an optical device in the reference level the circumferential distance of the two gaps from each other is measured and, in the case of deviations of said circumferential distance from a given nominal value, a new reference level is fixed by changing the reference level in which the measured circumferential distance corresponds to the nominal value, after which the gap width of the operative gaps is reduced to the given size with reference to said level by means of the laser beam.

3. A method as claimed in claim 1 wherein the material removal produced by the laser beam is carried out in the form of grooves having a trapezoidal cross-section reducing towards the reference level.

4. A method as claimed in claim 1 wherein after reducing the gap width of the operative gap to the given size in the area of the operative gap remote from the tape contact face of the magnetic head by means of a laser beam directed on the major surface of the plate-shaped magnetic circuit by material removal, a recess widening the coil window is formed which reduces the gap height of the operative gap to a given size.

* * * * *